Aug. 16, 1949.  A. C. HOWARD  2,479,114
HAND STARTING MECHANISM FOR
INTERNAL-COMBUSTION ENGINES
Filed July 9, 1947

Arthur Clifford Howard
Inventor by
Cushman, Darby & Cushman
Attorneys

Patented Aug. 16, 1949

2,479,114

UNITED STATES PATENT OFFICE 2,479,114

HAND STARTING MECHANISM FOR INTERNAL-COMBUSTION ENGINES

Arthur Clifford Howard, Leeds, England

Application July 9, 1947, Serial No. 759,876
In Great Britain March 14, 1946

6 Claims. (Cl. 123—179)

This invention relates to hand starting mechanism for internal combustion engines of the kind employing an auxiliary or starter flywheel capable of being coupled to or meshed with the existing flywheel at the rear of the engine and uncoupled or thrown out of mesh when the engine commences to turn under its own power at a predetermined rate. The chief object of the present invention is to provide a new or improved construction of hand starting mechanism employing an auxiliary or starter flywheel which will be more effective in operation and at the same time positive in its disengagement when the engine has been started.

According to the invention an auxiliary inertia member of flywheel form is capable of being manually engaged with the engine and disengaged by the action of a centrifugally operated catch and spring action, said auxiliary inertia member being immediately brought to rest after disengagement for subsequent use. The auxiliary inertia member of flywheel form may be associated with a pinion adapted to be meshed with the flywheel of the engine against the action of a spring which co-operates with the centrifugally actuated release catch to withdraw the pinion from engagement with the engine flywheel and bring the auxiliary inertia member or flywheel to rest by causing it to engage or be engaged by a stationary friction disc when the engine has started and is rotating under its own power. A further feature of the invention is that the pinion is carried at the end of a rotatable sliding shaft which also carries the auxiliary inertia member or flywheel in such a manner that movement in an axial direction causes the pinion to engage or disengage from the teeth of the engine flywheel. Axial movement of the shaft to engage the pinion with the engine flywheel effect compression of the spring and causes the co-operating centrifugally operable means or release catch to maintain the spring in compression and the pinion in engagement with the flywheel of the engine. The centrifugally operated release catch may comprise a pair of release weights pivotally mounted to a support on the shaft adjacent to the auxiliary inertia member or flywheel and urged towards each other by means of a pair of tension springs. The release weights are adapted to engage an abutment formed on a fixed sleeve affording a bearing for the shaft carrying the pinion.

In order that the invention may be clearly understood and readily carried into effect, the same will now be more fully described with reference to and by the aid of the accompanying drawings wherein.

Figure 1:
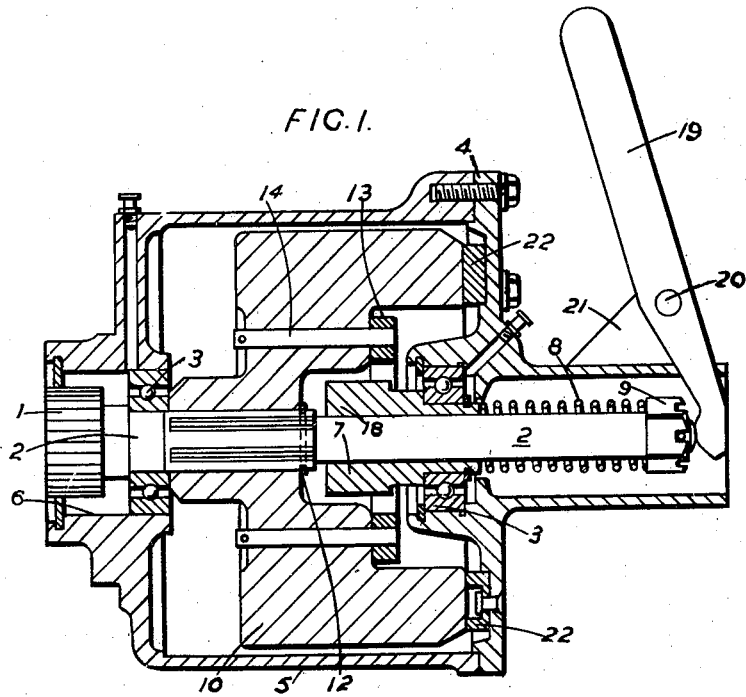
Figure 1 is a sectional elevation of an auxiliary inertia member or flywheel with its attendant mechanism constructed in accordance with the invention.
Figure 2:
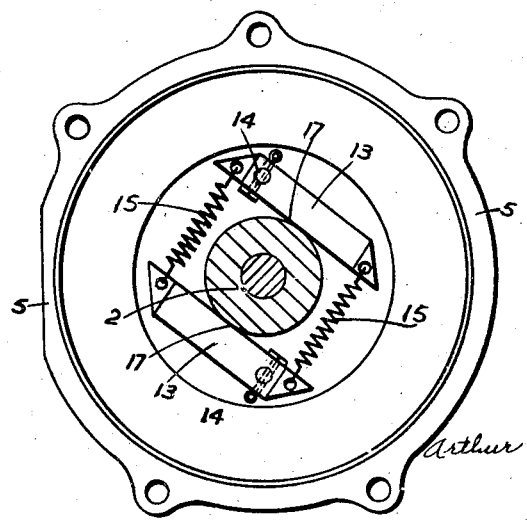
Figure 2 is a sectional end elevation of Figure 1 but with the cover plate removed to show the centrifugal release mechanism.

Referring to the drawings, a pinion 1, capable of being brought into and out of engagement with the teeth on an engine flywheel (not shown) is fixed on the end of an axially slidable shaft 2 carried in bearings 3 mounted in the end plate 4 and in a housing 5 adapted to be bolted or secured to the engine crank case or cylinder block. The bearing 3 adjacent to the pinion will be slidable in the bore 6 formed in the housing 5, whilst the bearing 3 at the other end will be mounted around a sleeve 7 on the shaft 2 and held in a recess in the end plate 4 remote from the pinion 1. The shaft projects through this latter end plate 4 and has a helical spring 8 placed thereon held between the end of the sleeve 7 and a nut 9 secured at or towards the end of the projecting portion of the shaft 2. Splined on to the axial shaft 2 is an auxiliary inertia member in the form of a flywheel 10 positioned on the shaft 2 by means of a spring clip (circlip) 12 in such a manner that the auxiliary flywheel 10 rotates and moves axially with the shaft 2.

The flywheel 10 on the shaft 2 carries a pair of weights 13 pivoted at 14 and diametrically positioned relative to each other. The weight members 13 are connected together by means of a pair of springs 15, said springs tending to maintain the middle portion 17 of the weights 13 in contact with an abutment 18 formed on the sleeve 7 through which the shaft 2 passes. The middle portion 17 of the weights 13 ride over the abutment 18 when the axial shaft 2 together with the pinion 1 and auxiliary flywheel 10 are moved within the housing 5 to cause the pinion to mesh with the teeth of the engine flywheel and the said middle portions 17 of the weights 13 engage the annular abutment 18 to hold the shaft 2 in its engaged position. An operating handle 19 pivotally mounted at 20 on a bracket 21 secured to the end plate 4 of the housing 5 engages the projecting end of the axial shaft 2 to enable the latter to be moved as previously described.

A convenient ratio between the pinion and the engine flywheel is about 12 to 1.

The end plate 4 between the spring 8 and the auxiliary flywheel 10 is provided on its inner face with the friction disc 22 against which the auxiliary flywheel 10 contacts when the shaft 2 has been withdrawn by means of the spring 8 and the pinion is fully clear of the engine flywheel. The contacting of the flywheel 10 with the friction disc 22 brings the flywheel to rest so that it is ready for the next operation or starting.

To start the engine, the operating lever 19 is moved over to cause the axial shaft 2 to slide and engage the pinion 1 with the engine flywheel whereupon the spring 8 on the axial shaft 2 is compressed and held by the engagement of the middle portions 17 of the weights 13 with the annular abutment 18 on the sleeve 7. The exhaust valve lifter (when such is fitted) of the decompression device is actuated and the engine then swung by means of the starting handle. The auxiliary inertia or flywheel member 10 commences to rotate with the engine flywheel and in view of the ratio between the two flywheels, the auxiliary flywheel 10 soon reaches a relatively high rate of revolution, storing up energy which adds to that of the engine flywheel. As soon as the engine fires and commences to rotate under its own power, the pinion and auxiliary flywheel are driven by the engine at an increased speed which results in the weights 13 being thrown off the abutment 18 by reason of centrifugal force acting thereon and the compressed spring 8 is released to withdraw the axial shaft 2 and disengage the pinion 1 from the engine flywheel tooth. Further withdrawal of the axial shaft 2 brings the auxiliary flywheel 10 into contact with the friction disc 22 to arrest its rotation with the result that the auxiliary flywheel and its mechanism are ready for the next operation. Thus should the engine stop after a few revolutions it is not necessary to wait for the auxiliary flywheel 10 to slow down and come to rest as it is stopped immediately after the pinion has been withdrawn clear of the engine flywheel by the spring.

Whilst the invention has been described with reference to hand starting of internal combustion engines, it will be readily appreciated that the invention can be applied to other forms of starting.

I claim:

1. In a starting mechanism for internal combustion engines, an axially slidable shaft having a driving pinion adapted to be moved in and out of operative engagement with the flywheel of the engine, an auxiliary flywheel, means connecting the auxiliary flywheel to said shaft so that the auxiliary flywheel rotates and is axially movable with the shaft, centrifugally operable means mounted on said auxiliary flywheel, yieldable means for normally urging the pinion and shaft axially away from the engine flywheel, means for moving the shaft axially inward against the tension of said spring so as to engage the pinion with the flywheel engine, and means on said shaft releasably engageable with said centrifugally operable means when the shaft moves the pinion into engagement with the engine flywheel to prevent outward movement of the shaft, the rotation of the engine flywheel in excess of a predetermined speed causing the centrifugal means to be released from said shaft and the spring to be expanded so as to move the shaft and pinion axially away from the engine flywheel.

2. In a starting mechanism for internal combustion engines, an axially slidable shaft having a driving pinion adapted to be moved in and out of operative engagement with the flywheel of the engine, an auxiliary flywheel, means connecting the auxiliary flywheel to said shaft so that the auxiliary flywheel rotates and is axially movable with the shaft, centrifugally operable means mounted on said auxiliary flywheel, yieldable means for normally urging the pinion and shaft axially away from the engine flywheel, means for moving the shaft axially inward against the tension of said spring so as to engage the pinion with the flywheel engine, means on said shaft releasably engageable with said centrifugally operable means when the shaft moves the pinion into engagement with the engine flywheel to prevent outward movement of the shaft, the rotation of the engine flywheel in excess of a predetermined speed causing the centrifugal means to be released from said shaft and the spring to be expanded so as to move the shaft and pinion axially away from the engine flywheel, and means for arresting the rotative movement of the auxiliary flywheel after disengagement of the pinion from the engine flywheel.

3. In a starting mechanism for internal combustion engines, an axially slidable shaft having a driving pinion adapted to be moved in and out of operative engagement with the flywheel of the engine, an auxiliary flywheel, means connecting the auxiliary flywheel to said shaft so that the auxiliary flywheel rotates and is axially movable with the shaft, yieldable means for normally urging the pinion and shaft axially away from the engine flywheel, means for moving the shaft axially inward against the tension of said spring so as to engage the pinion with the flywheel engine. a centrifugally actuated release catch means mounted on said auxiliary flywheel, and said shaft having an abutment engageable with said catch means for maintaining the pinion in engagement with the engine flywheel when the shaft is moved inwardly against the tension of said yieldable means, the rotation of the flywheel in excess of a predetermined speed causing the catch means to be released from said abutment and the yieldable means to be expanded so as to move the shaft and pinion axially away from the engine flywheel.

4. In a starting mechanism for internal combustion engines, an axially slidable shaft having a driving pinion adapted to be moved in and out of operative engagement with the flywheel of the engine, an auxiliary flywheel, means connecting the auxiliary flywheel to said shaft so that the auxiliary flywheel rotates and is axially movable with the shaft, yieldable means for normally urging the pinion and shaft axially away from the engine flywheel, means for moving the shaft axially inward against the tension of said spring so as to engage the pinion with the flywheel engine, a centrifugally actuated release catch means mounted on said auxiliary flywheel, said shaft having an abutment engageable with said catch for maintaining the pinion in engagement with the engine flywheel when the shaft is moved inwardly against the tension of said yieldable means, the rotation of the flywheel in excess of a predetermined speed causing the catch means to be released from said abutment and the yieldable means to be expanded so as to move the shaft and pinion axially away from the engine flywheel, and means for arresting the rotative movement of the auxiliary flywheel after disengagement of the pinion from the engine flywheel.

5. In a starting mechanism for internal combustion engines as called for in claim 3 in which the centrifugally actuated release catch means includes a pair of weight members pivotally mounted on the auxiliary flywheel on opposite sides of said shaft, and springs connected to the ends of said weight members for urging them toward each other, said weight members arranged to releasably engage the abutment on said shaft.

6. In a starting mechanism for internal combustion engines as called for in claim 4 in which the centrifugally actuated release catch means includes a pair of weight members pivotally mounted to said auxiliary flywheel on opposite sides of said shaft, means urging the weight members toward each other, said weight members arranged to releasably engage the abutment on said shaft, a fixed housing enclosing the auxiliary flywheel and the centrifugally operated catch means, and an operating handle pivotally mounted on the housing and engaging the outer end of said shaft for moving the pinion into engagement with the engine flywheel.

ARTHUR CLIFFORD HOWARD.

REFERENCES CITED

The following references are of record in the file of this patent:

UNITED STATES PATENTS

| Number | Name | Date |
| --- | --- | --- |
| 2,163,829 | Chilton | June 27, 1939 |